United States Patent
Choi et al.

(10) Patent No.: US 9,917,297 B2
(45) Date of Patent: Mar. 13, 2018

(54) METHOD FOR PREPARING POSITIVE ELECTRODE ACTIVE MATERIAL FOR LITHIUM SECONDARY BATTERY

(71) Applicant: L&F Co., Ltd., Daegu (KR)

(72) Inventors: Su An Choi, Gyeonggi-do (KR); Sang-Hoon Jeon, Daegu (KR)

(73) Assignee: L&F Material Co., Ltd., Daegu (KR)

( * ) Notice: Subject to any disclaimer, the term of this patent is extended or adjusted under 35 U.S.C. 154(b) by 199 days.

(21) Appl. No.: 15/144,988

(22) Filed: May 3, 2016

(65) Prior Publication Data

US 2016/0248078 A1    Aug. 25, 2016

Related U.S. Application Data

(60) Division of application No. 14/227,820, filed on Mar. 27, 2014, which is a continuation-in-part of (Continued)

(30) Foreign Application Priority Data

Mar. 13, 2012  (KR) .................. 10-2012-0025695

(51) Int. Cl.
*H01M 4/131*   (2010.01)
*H01M 8/04*   (2016.01)
(Continued)

(52) U.S. Cl.
CPC ............ *H01M 4/131* (2013.01); *C01D 15/02* (2013.01); *C01G 53/50* (2013.01);
(Continued)

(58) Field of Classification Search
None
See application file for complete search history.

(56) References Cited

U.S. PATENT DOCUMENTS

| | | |
|---|---|---|
| 2007/0218363 A1 | 9/2007 | Paulsen et al. |
| 2009/0068561 A1 | 3/2009 | Sun et al. |

(Continued)

FOREIGN PATENT DOCUMENTS

| | | |
|---|---|---|
| JP | 2003142091 A | 5/2003 |
| JP | 2007066839 A | 3/2007 |

(Continued)

OTHER PUBLICATIONS

International Search Report for PCT/KR2012/002286 dated Feb. 26, 2013.

(Continued)

*Primary Examiner* — Sarah A. Slifka
*Assistant Examiner* — Haroon S. Sheikh
(74) *Attorney, Agent, or Firm* — Marshall, Gerstein & Borun LLP

(57) ABSTRACT

Disclosed are a method for preparing a positive electrode active material for a lithium secondary battery and a positive electrode active material for a lithium secondary battery, the method including: preparing a mixture of a precursor represented by Chemical Formula 1 below, a lithium composite oxide represented by Chemical Formula 2 below and capable of intercalating/deintercalating lithium ions, and a lithium feed material; and firing the prepared mixture:

$A(OH)_{2-a}$   [Chemical Formula 1]

$Li[Li_zA_{(1-z-a)}D_a]E_bO_{2-b}$   [Chemical Formula 2]

13 Claims, 3 Drawing Sheets

Related U.S. Application Data application No. PCT/KR2012/002286, filed on Mar. 28, 2012.

(51) Int. Cl.

| | |
|---|---|
| *H01M 4/505* | (2010.01) |
| *H01M 4/525* | (2010.01) |
| *C01G 53/00* | (2006.01) |
| *C01D 15/02* | (2006.01) |
| *H01M 4/04* | (2006.01) |
| *H01M 4/58* | (2010.01) |
| *H01M 4/1391* | (2010.01) |
| *H01M 4/485* | (2010.01) |
| *H01M 10/0525* | (2010.01) |
| *H01M 10/052* | (2010.01) |
| *H01M 4/02* | (2006.01) |

(52) U.S. Cl.
CPC ....... *H01M 4/0471* (2013.01); *H01M 4/1391* (2013.01); *H01M 4/485* (2013.01); *H01M 4/505* (2013.01); *H01M 4/525* (2013.01); *H01M 4/5825* (2013.01); *H01M 8/04* (2013.01); *H01M 10/0525* (2013.01); *C01P 2002/52* (2013.01); *C01P 2004/61* (2013.01); *C01P 2004/80* (2013.01); *C01P 2004/84* (2013.01); *C01P 2006/40* (2013.01); *H01M 10/052* (2013.01); *H01M 2004/028* (2013.01); *Y02E 60/122* (2013.01); *Y02P 70/54* (2015.11)

(56) References Cited

U.S. PATENT DOCUMENTS

2009/0087744 A1    4/2009  Jiang
2011/0240913 A1  10/2011  Kim et al.

FOREIGN PATENT DOCUMENTS

| JP | 2011216485 A | 10/2011 |
|---|---|---|
| KR | 1020070095201 | 9/2007 |
| KR | 1020070097923 | 10/2007 |
| KR | 1020090082790 | 7/2009 |
| KR | 1020100085939 | 7/2010 |
| KR | 1020110109879 | 10/2011 |

OTHER PUBLICATIONS

Notice of Allowance in KR Application No. 10-2013-0026939 dated Dec. 31, 2015, 5 pages.

METHOD FOR PREPARING POSITIVE ELECTRODE ACTIVE MATERIAL FOR LITHIUM SECONDARY BATTERY

CROSS-REFERENCE TO RELATED APPLICATION

This is a division of U.S. application Ser. No. 14/227,820 filed Mar. 27, 2014, which is a continuation-in-part of PCT/KR2012/002286 filed Mar. 28, 2012, which in turn claims priority to and the benefit of Korean Patent Application No. 10-2012-0025695 filed Mar. 13, 2012, the entire contents of which are incorporated herein by reference.

BACKGROUND OF THE INVENTION (a) Field of the Invention

The present invention relates to a method for preparing a positive electrode active material for a lithium secondary battery, a positive electrode active material for a lithium secondary battery, and a lithium secondary battery including the same.

(b) Description of the Related Art

Recently, with respect to the trend of miniaturization and lightweight of portable electronic devices, the batteries used as power for the devices need to be have high performance and high capacity.

Batteries generate electric power by using materials capable of having an electrochemical reaction at positive and negative electrodes. Of these batteries, a representative example is a lithium secondary battery in which electric energy is generated due to a change in a chemical potential when lithium ions are intercalated/deintercalated at positive and negative electrodes.

The lithium secondary battery is manufactured by using a material capable of reversibly intercalating/deintercalating lithium ions for positive electrode and negative electrode active materials and charging an organic electrolyte or a polymer electrolyte between a positive electrode and a negative electrode.

As for the positive electrode active material for the lithium secondary battery, a lithium composite compound is used, and examples thereof may include metal composite oxides such as $LiCoO_2$, $LiMn_2O_4$, $LiNiO_2$, and $LiMnO_2$, which have been researched.

Of these positive electrode active materials, Mn-based positive electrode active materials, such as $LiMn_2O_4$ and $LiMnO_2$, are attractive since they are easy to synthesize, are relatively cheap, have relatively excellent thermal stability at the time of overcharging as compared with the other active materials, and have less pollution on environment. However, these materials have a drawback in that the capacity is small.

$LiCoO_2$ is a representative positive electrode active material that is currently commercialized on the market since it has favorable electrical conductivity and a high battery voltage of about 3.7 V as well as excellent cycle lifespan characteristics, stability, and discharge capacity. However, $LiCoO_2$ is not priced competitively since it is expensive and thus accounts for 30% or more of the battery price.

$LiNiO_2$ is difficult to synthesize even though it provides the highest charge capacity in the above-mentioned positive electrode active materials. Moreover, the high oxidation state of nickel is a causative factor of deteriorating battery and electrode lifespan characteristics. Moreover, the self discharge of nickel is severe and reversibility of nickel is deteriorated. Moreover, nickel insufficiently secures stability and thus is difficult to commercialize.

For the improvement in stability and capacity of the battery, JP 2011-216485 discloses a positive electrode active material for a lithium secondary battery, in which lithium nickel composite oxides having different particle size distributions and different compositions are mixed. Here, the degree of improvement is explained as a synergy effect due to the physical mixing of different positive electrode active materials.

KR2012-0017004 discloses a positive electrode active material for a lithium secondary battery, which is prepared by mixing precursors having different compositions and firing the mixture together with a lithium compound. However, since the firing temperature needs to be varied depending on the compositional ratio of Ni/Co/Mn in order to exhibit the maximum performance for the compositions, the corresponding technology is restricted to a mixture of precursors having very similar compositions.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a positive electrode active material having advantages of having high capacity and high efficiency as well as improved high-rate characteristic and long lifespan characteristics.

An exemplary embodiment of the present invention provides a method for preparing a positive electrode active material for a lithium secondary battery, the method including: preparing a mixture of a precursor represented by Chemical Formula 1 below, a lithium composite oxide represented by Chemical Formula 2 below and capable of intercalating/deintercalating lithium ions, and a lithium feed material; and firing the prepared mixture:

$A(OH)_{2-a}$  [Chemical Formula 1]

wherein in Chemical Formula 1, $A=Ni_\alpha Co_\beta Mn_\gamma$; and $-0.3 \leq a \leq 0.3$, $0.5 \leq \alpha \leq 0.64$, $0.15 \leq \beta \leq 0.29$, and $0.21 \leq \gamma \leq 0.35$,

$Li[Li_z A_{(1-z-a)} D_a] E_b O_{2-b}$  [Chemical Formula 2]

wherein in Chemical Formula 2, $A=Ni_\alpha Co_\beta Mn_\gamma$; D is at least one element selected from the group consisting of Mg, Al, B, Zr, and Ti; E is at least one element selected from the group consisting of P, F, and S; and $-0.05 \leq z \leq 0.1$, $0 \leq a \leq 0.05$, $0 \leq b \leq 0.05$, $0.35 \leq \alpha < 0.5$, $0.19 \leq \beta \leq 0.34$, and $0.31 \leq \gamma \leq 0.46$.

The weight ratio of the precursor represented by Chemical Formula 1 to the lithium composite oxide represented by Chemical Formula 2 and capable of intercalating/deintercalating lithium ions may be 95/5 to 70/30.

The precursor represented by Chemical Formula 1 may have a particle diameter of 8 to 12 μm.

The lithium composite oxide represented by Chemical Formula 2 and capable of intercalating/deintercalating lithium ions may have a particle diameter of 3 to 8 μm.

The lithium feed material may be nitrate, carbonate, acetate, oxalate, oxide, hydroxide, or sulfate, which contains lithium, or a combination thereof.

The precursor represented by Chemical Formula 1 may be represented by Chemical Formula 3 below:

$A(OH)_{2-a}$  [Chemical Formula 3]

In Chemical Formula 3, $A=Ni_\alpha Co_\beta Mn_\gamma$; and $-0.3 \leq a \leq 0.3$, $0.5 \leq \alpha \leq 0.61$, $0.15 \leq \beta \leq 0.26$, and $0.24 \leq \gamma \leq 0.35$.

The lithium composite oxide represented by Chemical Formula 2 and capable of intercalating/deintercalating lithium ions may be represented by Chemical Formula 4 below:

$$\text{Li}[\text{Li}_z\text{A}_{(1-z-a)}\text{D}_a]\text{E}_b\text{O}_{2-b} \quad \text{[Chemical Formula 4]}$$

wherein in Chemical Formula 4, $A=\text{Ni}_\alpha\text{Co}_\beta\text{Mn}_\gamma$; D is at least one element selected from the group consisting of Mg, Al, B, Zr, and Ti; E is at least one element selected from the group consisting of P, F, and S; and $-0.05 \le z \le 0.1$, $0 \le a \le 0.05$, $0 \le b \le 0.05$, $0.43 \le \alpha < 0.5$, $0.19 \le \beta \le 0.26$, and $0.31 \le \gamma \le 0.38$.

Here, in the firing of the prepared mixture, the firing temperature may be 800 to 1000° C.

The particle diameter of the precursor represented by Chemical Formula 1 may be larger than the particle diameter of the lithium composite oxide represented by Chemical Formula 2 and capable of intercalating/deintercalating lithium ions.

The amount of remaining water-soluble lithium after the firing of the prepared mixture may be reduced to 20 to 50% based on the amount of remaining water-soluble lithium when the precursor represented by Chemical Formula 1 is fired alone.

Here, in the positive electrode active material for a lithium secondary battery, which is obtained by performing the firing of the prepared mixture, the surface Ni content of a positive electrode active material derived from Chemical Formula 1 may be further reduced than the surface Ni content of a positive electrode active material prepared by firing the precursor represented by Chemical Formula 1 alone.

The surface Ni content of the positive electrode active material derived from Chemical Formula 1 may be further reduced by less than 5% than the surface Ni content of the positive electrode active material prepared by firing the precursor represented by Chemical Formula 1 alone.

Here, when ten particles of the positive electrode active material derived from Chemical Formula 1 are randomly selected from the positive electrode active material for a lithium secondary battery and surfaces thereof are analyzed, the standard deviation of the Ni content may be smaller than 1.00.

Another embodiment of the present invention provides a positive electrode active material for a lithium secondary battery, the positive electrode active material including: a lithium composite oxide represented by Chemical Formula 5 below and capable of intercalating/deintercalating lithium ions; and a lithium composite oxide represented by Chemical Formula 2 below and capable of intercalating/deintercalating lithium ions, wherein the lithium composite oxide represented by Chemical Formula 5 below and capable of intercalating/deintercalating lithium ions is prepared from a precursor, and wherein the surface Ni content of the lithium composite oxide represented by Chemical Formula 5 below and capable of intercalating/deintercalating lithium ions is further reduced than the surface Ni content of a lithium composite oxide prepared by firing the precursor alone:

$$\text{Li}[\text{Li}_z\text{A}_{(1-z-a)}\text{D}_a]\text{E}_b\text{O}_{2-b} \quad \text{[Chemical Formula 5]}$$

wherein in Chemical Formula 5, $A=\text{Ni}_\alpha\text{Co}_\beta\text{Mn}_\gamma$; D is at least one element selected from the group consisting of Mg, Al, B, Zr, and Ti; E is at least one element selected from the group consisting of P, F, and S; and $-0.05 \le z \le 0.1$, $0 \le a \le 0.05$, $0 \le b \le 0.05$, $0.5 \le \alpha < 0.64$, $0.15 \le \beta \le 0.29$, and $0.21 \le \gamma \le 0.35$, and $$\text{Li}[\text{Li}_z\text{A}_{(1-z-a)}\text{D}_a]\text{E}_b\text{O}_{2-b} \quad \text{[Chemical Formula 2]}$$

wherein in Chemical Formula 2, $A=\text{Ni}_\alpha\text{Co}_\beta\text{Mn}_\gamma$; D is at least one element selected from the group consisting of Mg, Al, B, Zr, and Ti; E is at least one element selected from the group consisting of P, F, and S; and $-0.05 \le z \le 0.1$, $0 \le a \le 0.05$, $0 \le b \le 0.05$, $0.35 \le \alpha < 0.5$, $0.19 \le \beta \le 0.34$, and $0.31 \le \gamma \le 0.46$.

The particle diameter of the lithium composite oxide represented by Chemical Formula 5 and capable of intercalating/deintercalating lithium ions may be larger than the particle diameter of the lithium composite oxide represented by Chemical Formula 2 and capable of intercalating/deintercalating lithium ions.

The lithium composite oxide expressed by Chemical Formula 5 and capable of intercalating/deintercalating lithium ions may have a particle diameter of 8 to 12 μm.

The lithium composite oxide expressed by Chemical Formula 2 and capable of intercalating/deintercalating lithium ions may have a particle diameter of 3 to 8 μm.

The weight ratio of the lithium composite oxide represented by Chemical Formula 5 and capable of intercalating/deintercalating lithium ions to the lithium composite oxide represented by Chemical Formula 2 and capable of intercalating/deintercalating lithium ions may be 95/5 to 70/30.

The lithium composite oxide represented by Chemical Formula 5 and capable of intercalating/deintercalating lithium ions may be represented by Chemical Formula 6 below:

$$\text{Li}[\text{Li}_z\text{A}_{(1-z-a)}\text{D}_a]\text{E}_b\text{O}_{2-b} \quad \text{[Chemical Formula 6]}$$

wherein in Chemical Formula 6, $A=\text{Ni}_\alpha\text{Co}_\beta\text{Mn}_\gamma$; D is at least one element selected from the group consisting of Mg, Al, B, Zr, and Ti; E is at least one element selected from the group consisting of P, F, and S; and $-0.05 \le z \le 0.1$, $0 \le a \le 0.05$, $0 \le b \le 0.05$, $0.50 \le \alpha < 0.61$, $0.15 \le \beta \le 0.26$, and $0.24 \le \gamma \le 0.35$.

The lithium composite oxide represented by Chemical Formula 2 and capable of intercalating/deintercalating lithium ions may be represented by Chemical Formula 4 below:

$$\text{Li}[\text{Li}_z\text{A}_{(1-z-a)}\text{D}_a]\text{E}_b\text{O}_{2-b} \quad \text{[Chemical Formula 4]}$$

wherein in Chemical Formula 4, $A=\text{Ni}_\alpha\text{Co}_\beta\text{Mn}_\gamma$; D is at least one element selected from the group consisting of Mg, Al, B, Zr, and Ti; E is at least one element selected from the group consisting of P, F, and S; and $-0.05 \le z \le 0.1$, $0 \le a \le 0.05$, $0 \le b \le 0.05$, $0.43 \le \alpha < 0.5$, $0.19 \le \beta \le 0.26$, and $0.31 \le \gamma \le 0.38$.

Yet another embodiment of the present invention provides a lithium secondary battery including a positive electrode, an anode, and an electrolyte, wherein the positive electrode includes a current collector and a positive electrode active material layer formed on the current collector, and wherein the positive electrode active material layer contains the above-described positive electrode active material according to an embodiment of the present invention.

According to an embodiment of the present invention, there can be obtained a positive electrode active material having high capacity and high efficiency as well as improved high-rate characteristics and long lifespan characteristics.

DETAILED DESCRIPTION OF THE EMBODIMENTS

Figure 1:
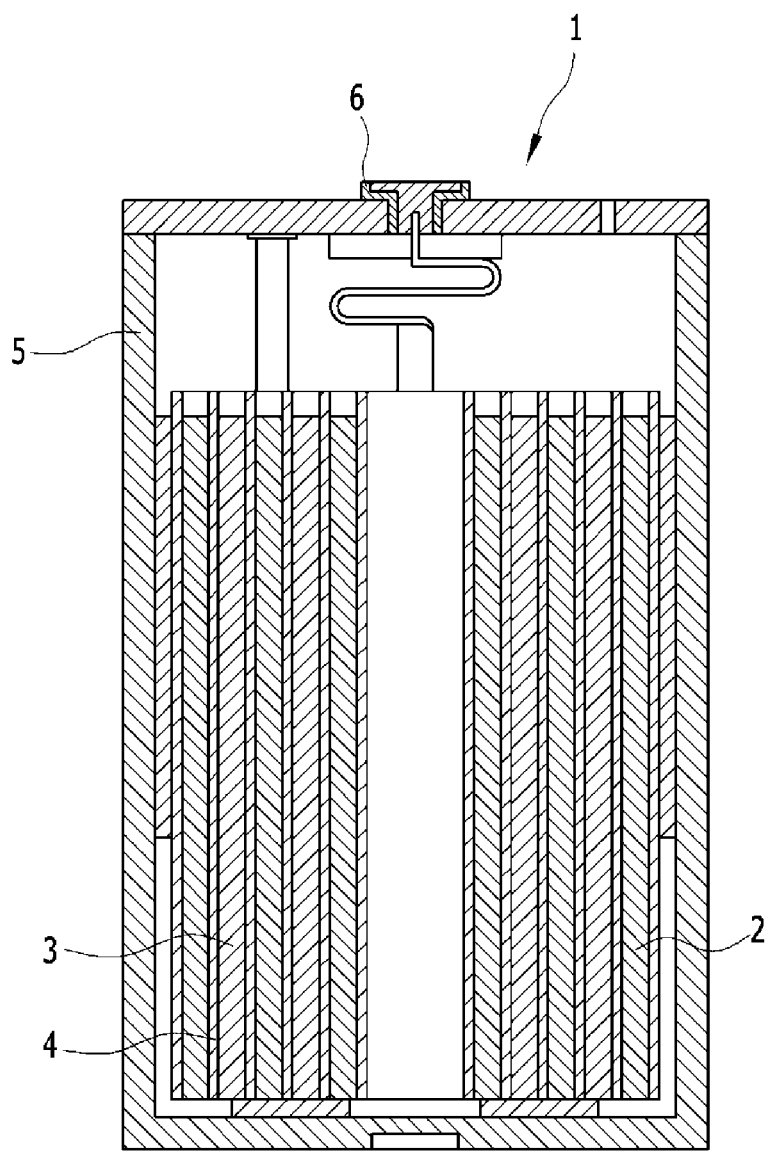
FIG. 1 is a schematic view of a lithium secondary battery.
Figure 2:
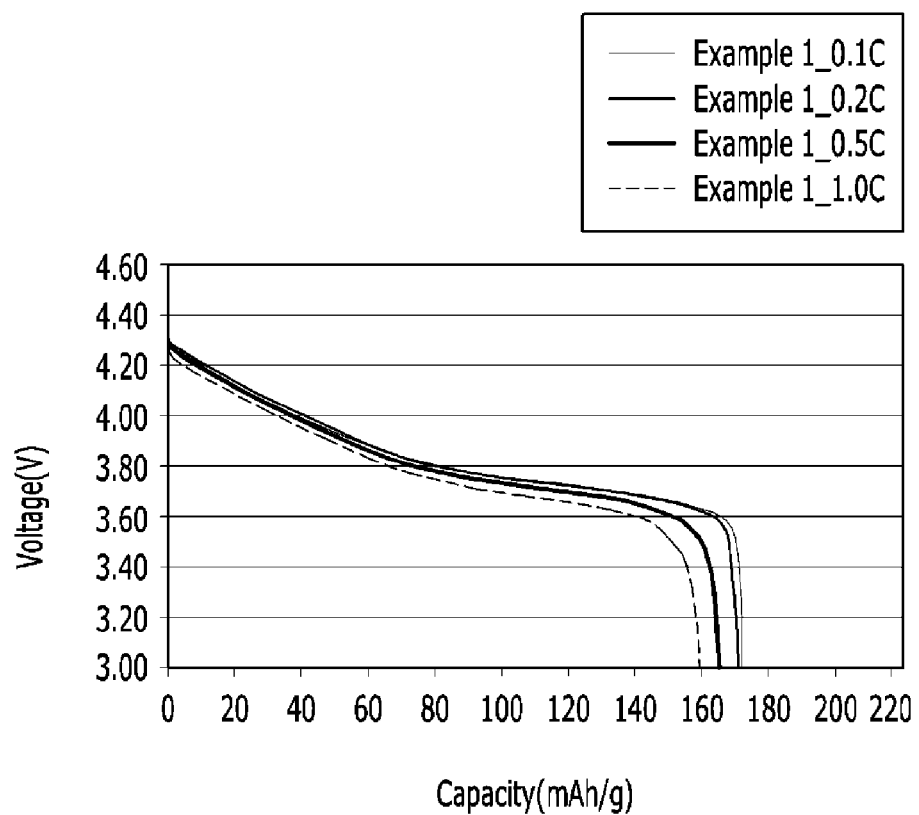
FIG. 2 is a discharge graph showing rate characteristics of a battery of Example 1.
Figure 3:
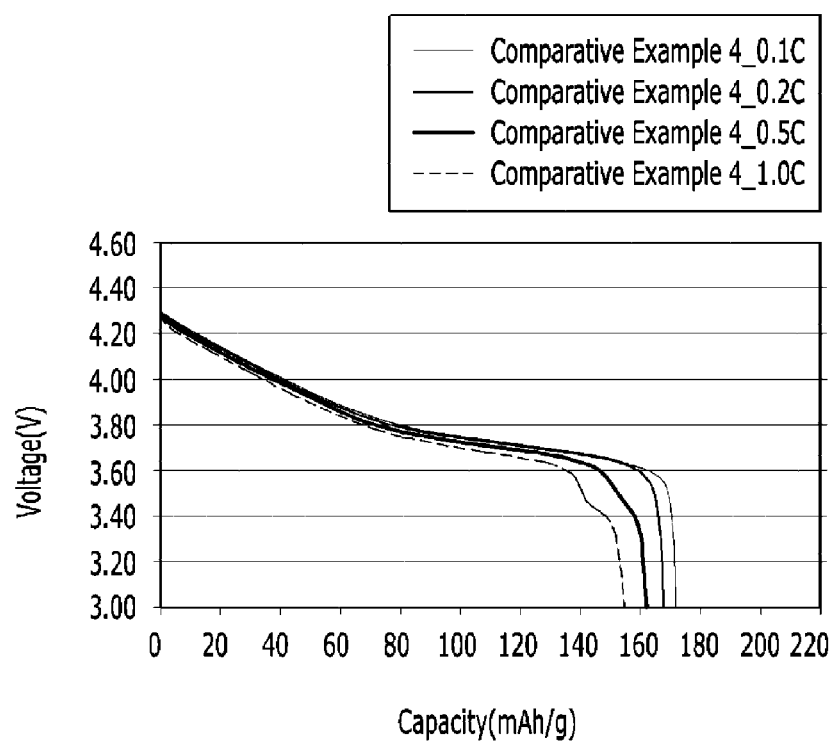
FIG. 3 is a discharge graph showing rate characteristics of a battery of Comparative Example 4.

Hereinafter, embodiments of the present invention will be described in detail. However, these embodiments are merely exemplified, and the scope of protection of the present invention is not limited thereto but defined by the appended claims.

In an embodiment of the present invention, there is provided a method for preparing a positive electrode active material for a lithium secondary battery, the method including: preparing a mixture of a precursor represented by Chemical Formula 1 below, a lithium composite oxide represented by Chemical Formula 2 below and capable of intercalating/deintercalating lithium ions, and a lithium feed material; and firing the prepared mixture:

$$A(OH)_{2-a} \quad \text{[Chemical 1]}$$

wherein in Chemical Formula 1, $A=Ni_\alpha Co_\beta Mn_\gamma$; and $-0.3 \leq a \leq 0.3$, $0.5 \leq \alpha \leq 0.64$, $0.15 \leq \beta \leq 0.29$, and $0.21 \leq \gamma \leq 0.35$, $$Li[Li_z A_{(1-z-a)} D_a] E_b O_{2-b} \quad \text{[Chemical Formula 2]}$$

wherein in Chemical Formula 2, $A=Ni_\alpha Co_\beta Mn_\gamma$; D is at least one element selected from the group consisting of Mg, Al, B, Zr, and Ti; E is at least one element selected from the group consisting of P, F, and S; and $-0.05 \leq z \leq 0.1$, $0 \leq a \leq 0.05$, $0 \leq b \leq 0.05$, $0.35 \leq \alpha < 0.5$, $0.19 \leq \beta \leq 0.34$, and $0.31 \leq \gamma \leq 0.46$.

The weight ratio of the precursor represented by Chemical Formula 1 to the lithium composite oxide represented by Chemical Formula 2 and capable of intercalating/deintercalating lithium ions (precursor/lithium composite oxide) may be 95/5 to 70/30. When this range is satisfied, the amount of lithium remaining after the firing can be reduced and discharge capacity characteristics of the battery can be improved.

The prepared positive electrode active material has two different composition groups of $Ni_\alpha Co_\beta Mn_\gamma$; and, of the particles having the two compositions, a particle having a higher Ni content may be a positive electrode active material particle in which the Ni content is higher in an inside than a surface.

This may be different from the conventional art in which positive electrode active materials with different compositions of $Ni_\alpha Co_\beta Mn_\gamma$ are individually fired and then mixed at a predetermined ratio.

As in an embodiment of the present invention, when the lithium feed material is added to the mixture of the precursor and the lithium composite oxide and then the firing is conducted, the lithium feed material reacts with the precursor and the lithium composite oxide.

The mixing of active materials according to the conventional art corresponds to simple physical mixing, which has some limitations in the improvement of powder characteristics and battery characteristics.

As in an embodiment of the present invention, the chemical reaction of the precursor, the lithium composite compound (e.g., heterogeneous active material), and Li is performed by mixing a lithium feed material with the precursor and the lithium composite compound, which have different compositions of $Ni_\alpha Co_\beta Mn_\gamma$, followed by firing, so that the chemical reaction of the precursor, lithium composite oxide, and lithium leads to a concentration gradient between two different compositions of $Ni_\alpha Co_\beta Mn_\gamma$.

Here, of the particles having the different compositions, a particle having a higher Ni content may be a positive electrode active material particle in which the Ni content is lower on its surface than inside.

Besides this chemical concentration gradient reaction, lithium reacts with a composition having a higher Mn content more selectively due to the presence of Mn which has been known to have excellent reactivity with lithium, thereby fundamentally preventing the generation of remaining water-soluble lithium in the composition having a higher Ni content.

The particle diameter of the lithium composite oxide represented by Chemical Formula 2 and capable of intercalating/deintercalating lithium ions may be smaller than the particle diameter of the precursor represented by Chemical Formula 1. This can offset a negative effect such as the power down which may result from lithium composite oxide represented by Chemical Formula 2 and having a relatively higher Mn content.

Since the lithium composite oxide represented by Chemical Formula 2 and capable of intercalating/deintercalating lithium ions has a higher Mn content and a smaller particle diameter than the precursor represented by Chemical Formula 1, Mn elution is more likely to occur. Therefore, the Mn elution can be controlled by appropriately adjusting the mixed ratio of the lithium composite oxide having a higher Mn content.

More specifically, the particle diameter of the precursor represented by Chemical Formula 1 may be 8 to 12 μm.

In addition, the particle diameter of the lithium composite oxide represented by Chemical Formula 2 and capable of intercalating/deintercalating lithium ions may be 3 to 8 μm.

The lithium feed material is nitrate, carbonate, acetate, oxalate, oxide, hydroxide, or sulfate, which contains lithium, or a combination thereof, but is not limited thereto.

More specifically, the precursor represented by Chemical Formula 1 may be represented by Chemical Formula 3 below:

$$A(OH)_{2-a} \quad \text{[Chemical Formula 3]}$$

wherein in Chemical Formula 3, $A=Ni_\alpha Co_\beta Mn_\gamma$; and $-0.3 \leq a \leq 0.3$, $0.5 \leq \alpha \leq 0.61$, $0.15 \leq \beta \leq 0.26$, and $0.24 \leq \gamma \leq 0.35$.

More specifically, the lithium composite oxide represented by Chemical Formula 2 and capable of intercalating/deintercalating lithium ions may be represented by Chemical Formula 4 below:

$$Li[Li_z A_{(1-z-a)} D_a] E_b O_{2-b} \quad \text{[Chemical Formula 4]}$$

wherein in Chemical Formula 4, $A=Ni_\alpha Co_\beta Mn_\gamma$; D is at least one element selected from the group consisting of Mg, Al, B, Zr, and Ti; E is at least one element selected from the group consisting of P, F, and S; $-0.05 \leq z \leq 0.1$, $0 \leq a \leq 0.05$, and $0 \leq b \leq 0.05$; and $0.43 \leq \alpha < 0.5$, $0.19 \leq \beta \leq 0.26$, and $0.3 \leq \gamma \leq 0.38$.

In the firing of the prepared mixture, the firing temperature may be 800 to 1000° C. The range may be appropriate to simultaneously fire the precursor and the lithium composite oxide according to an embodiment of the present invention.

The amount of remaining water-soluble lithium after the firing of the prepared mixture may be 20 to 50% based on the amount of remaining water-soluble lithium when the precursor represented by Chemical Formula 1 is fired alone.

The reduction of the remaining lithium can solve many of problems, such as instability of electrode plate slurry and gas generation after application to the battery, which result from a high amount of remaining lithium in the conventional art.

In the positive electrode active material for a lithium secondary battery, which is obtained by performing the firing of the prepared mixture, the surface Ni content of a positive electrode active material derived from Chemical Formula 1 may be further reduced than the surface Ni content of a positive electrode active material prepared by firing the precursor represented by Chemical Formula 1 alone.

The surface Ni content of the positive electrode active material derived from Chemical Formula 1 may be further reduced by less than 5% than the surface Ni content of the positive electrode active material prepared by firing the precursor represented by Chemical Formula 1 alone.

When ten particles of the positive electrode active material derived from Chemical Formula 1 are randomly selected from the positive electrode active material for a lithium secondary battery and surfaces thereof are analyzed, the standard deviation of the Ni content may be smaller than 1.00.

Descriptions thereof are shown as described above, and thus will be omitted.

In another embodiment of the present invention, there is provided a positive electrode active material for a lithium secondary battery, the positive electrode active material including: a lithium composite oxide represented by Chemical Formula 5 below and capable of intercalating/deintercalating lithium ions; and a lithium composite oxide represented by Chemical Formula 2 below and capable of intercalating/deintercalating lithium ions, wherein the lithium composite oxide represented by Chemical Formula 5 below and capable of intercalating/deintercalating lithium ions is prepared from a precursor, and wherein the surface Ni content of the lithium composite oxide represented by Chemical Formula 5 below and capable of intercalating/deintercalating lithium ions is further reduced than the surface Ni content of a lithium composite oxide prepared by firing the precursor alone:

$$Li[Li_zA_{(1-z-a)}D_a]E_bO_{2-b} \quad \text{[Chemical Formula 5]}$$

wherein in Chemical Formula 5, $A=Ni_\alpha Co_\beta Mn_\gamma$; D is at least one element selected from the group consisting of Mg, Al, B, Zr, and Ti; E is at least one element selected from the group consisting of P, F, and S; and $-0.05 \leq z \leq 0.1$, $0 \leq a \leq 0.05$, $0 \leq b \leq 0.05$, $0.5 \leq \alpha < 0.64$, $0.15 \leq \beta \leq 0.29$, and $0.21 \leq \gamma \leq 0.35$, and $$Li[Li_zA_{(1-z-a)}D_a]E_bO_{2-b} \quad \text{[Chemical Formula 2]}$$

wherein in Chemical Formula 2, $A=Ni_\alpha Co_\beta Mn_\gamma$; D is at least one element selected from the group consisting of Mg, Al, B, Zr, and Ti; E is at least one element selected from the group consisting of P, F, and S; and $-0.05 \leq z \leq 0.1$, $0 \leq a \leq 0.05$, $0 \leq b \leq 0.05$, $0.35 \leq \alpha < 0.5$, $0.19 \leq \beta \leq 0.34$, and $0.31 \leq \gamma \leq 0.46$.

The particle diameter of the lithium composite oxide represented by Chemical Formula 2 and capable of intercalating/deintercalating lithium ions may be smaller than the particle diameter of the lithium composite oxide represented by Chemical Formula 5 and capable of intercalating/deintercalating lithium ions.

Descriptions thereof overlap the above descriptions of the method for preparing a positive electrode active material for a lithium secondary battery according to the embodiment of the present invention, and thus will be omitted.

More specifically, the particle diameter of the lithium composite oxide represented by Chemical Formula 5 and capable of intercalating/deintercalating lithium ions may be 8 to 12 μm.

More specifically, the particle diameter of the lithium composite oxide represented by Chemical Formula 2 and capable of intercalating/deintercalating lithium ions may be 3 to 8 μm.

The weight ratio of the lithium composite oxide represented by Chemical Formula 5 and capable of intercalating/deintercalating lithium ions to the lithium composite oxide represented by Chemical Formula 2 and capable of intercalating/deintercalating lithium ions (Chemical Formula 5/Chemical Formula 2) may be 95/5 to 70/30.

When this range is satisfied, the amount of lithium remaining after the firing can be reduced and discharge capacity characteristics of the battery can be improved.

More specifically, the lithium composite oxide represented by Chemical Formula 5 and capable of intercalating/deintercalating lithium ions may be represented by Chemical Formula 6 below.

$$Li[Li_zA_{(1-z-a)}D_a]E_bO_{2-b} \quad \text{[Chemical Formula 6]}$$

wherein in Chemical Formula 6, $A=Ni_\alpha Co_\beta Mn_\gamma$; D is at least one element selected from the group consisting of Mg, Al, B, Zr, and Ti; E is at least one element selected from the group consisting of P, F, and S; $-0.05 \leq z \leq 0.1$, $0 \leq a \leq 0.05$, $0 \leq b \leq 0.05$; and $0.50 \leq \alpha < 0.61$, $0.15 \leq \beta \leq 0.26$, and $0.24 \leq \gamma \leq 0.35$.

More specifically, the lithium composite oxide represented by Chemical Formula 2 and capable of intercalating/deintercalating lithium ions may be represented by Chemical Formula 4 below:

$$Li[Li_zA_{(1-z-a)}D_a]E_bO_{2-b} \quad \text{[Chemical Formula 4]}$$

In Chemical Formula 4, $A=Ni_\alpha Co_\beta Mn_\gamma$; D is at least one element selected from the group consisting of Mg, Al, B, Zr, and Ti; E is at least one element selected from the group consisting of P, F, and S; $-0.05 \leq z \leq 0.1$; $0 \leq a \leq 0.05$; $0 \leq b \leq 0.05$; and $0.43 \leq \alpha < 0.5$, $0.19 \leq \beta \leq 0.26$, and $0.31 \leq \gamma \leq 0.38$.

In still another embodimento of the present invention, there is provided a lithium secondary battery including a positive electrode, an anode, and an electrolyte, wherein the positive electrode includes a current collector and a positive electrode active material layer formed on the current collector, and wherein the positive electrode active material layer contains the above-described positive electrode active material according to an embodiment of the present invention.

Descriptions of the positive electrode active material are the same as those in the embodiment of the present invention, and thus will be omitted.

The positive electrode active material layer may contain a binder and a conductor.

The binder serves to favorably bind positive electrode active material particles to each other and favorably bind the positive electrode active material to the current collector. Examples thereof may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductor is used to give conductivity to the electrodes, and any material that does not cause a chemical change and corresponds to an electronically conductive material may be used in batteries. As an example of the conductor, a conductive material containing a carbon based material, such as natural graphite, artificial graphite, carbon black, acetylene black, Ketjen black, or carbon fiber; a metal based material, such as a metal powder or a metal fiber of copper, nickel, aluminum, silver, or the like; a conductive polymer such as a polyphenylene derivative; or a mixture thereof, may be used.

The negative electrode includes a current collector and a negative electrode active material layer formed on the current collector, and the negative electrode active material layer contains a negative electrode active material.

Examples of the negative electrode active material may include a material capable of reversibly intercalating/deintercalating lithium ions, lithium, a lithium alloy, a material capable of doping and dedoping lithium, and a transition metal oxide.

The material capable of reversibly intercalating/deintercalating lithium ions is a carbon-based material. Any carbon-based negative electrode active material that can be generally used in a lithium ion secondary battery may be used, and representative examples thereof may include crystalline carbon, amorphous carbon, and a mixture thereof. Examples of the crystalline carbon may include formless, plate type, flake type, spherical, or fiber type natural graphite and artificial graphite. Examples of the amorphous carbon may include soft carbon (low-temperature fired carbon), hard carbon, mesophase pitch carbide, fired coke, and the like.

The lithium alloy may be an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material capable of doping and dedoping lithium may include Si, $SiO_x$(0<x<2), Si—Y alloys (wherein Y is an element selected from the group consisting of alkali metals, alkali earth metals, Group 13 elements, Group 14 elements, transition elements, rare earth elements, and combinations thereof, but is not Si), Sn, $SnO_2$, Sn—Y (wherein Y is an element selected from the group consisting of alkali metals, alkali earth metals, Group 13 elements, Group 14 elements, transition elements, rare earth elements, and combinations thereof, but is not Si), and the like, and at least one of these materials may be used in a mixture with $SiO_2$. Here, the element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

Examples of the transition metal oxide may include vanadium oxides, lithium-vanadium oxides, and the like.

The negative electrode active material layer also contains a binder, and may further optionally contain a conductor.

The binder serves to favorably bind negative electrode active material particles to each other and favorably bind a negative electrode active material to a current collector. Examples thereof may include polyvinyl alcohol, carboxymethyl cellulose, hydroxypropyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductor is used to give conductivity to the electrodes, and any material that does not cause a chemical change and corresponds to an electronically conductive material may be used in batteries. As an example of the conductor, a conductive material containing a carbon based material, such as natural graphite, artificial graphite, carbon black, acetylene black, Ketjen black, or carbon fiber; a metal based material, such as a metal powder or a metal fiber of copper, nickel, aluminum, silver, or the like; a conductive polymer such as a polyphenylene derivative; or a mixture thereof, may be used.

As for the current collector, at least one selected from the group consisting of a copper foil, a nickel foil, a stainless steel foil, a titanium foil, a nickel foam, a copper foam, a polymer substrate coated with a conductive metal, or a combination thereof may be used.

Al may be used for the current collector, but is not limited thereto.

The negative electrode and positive electrode are manufactured by mixing an active material, a conductor, and a binder in a solvent to prepare an active material composition and then coating the active material composition on a current collector. Since the electrode manufacturing method is well known in the art, detailed descriptions thereof will be omitted in the present specification. Examples of the solvent may include N-methyl pyrrolidone, but are not limited thereto.

The electrolyte contains a non-aqueous organic solvent and a lithium salt.

The non-aqueous organic solvent serves as a medium through which ions involved in an electrochemical reaction of a battery can move.

Examples of the non-aqueous organic solvent may include carbonate-based, ester-based, ether-based, ketone-based, alcohol-based, and aprotic solvent. Examples of the carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and the like. Examples of the ether-based solvent may include dibutyl ether, tetraglyme, diglyme, dimethoxy ethane, 2-methyl tetrahydrofuran, tetrahydrofuran, and the like. Examples of the ketone-based solvent may include cyclohexanone and the like. In addition, examples of the alcohol-based solvent may include ethyl alcohol, isopropyl alcohol, and the like. Examples of the aprotic solvent may include nitriles including R—CN (R is a C2-C20 straight, branched, or cyclic hydrocarbon group which may include a double bonded aromatic ring or an ether bond), amides including dimethylformamide, dioxolanes including 1,3-dioxolane, sulfolanes, and the like.

The non-aqueous organic solvents may be used alone or in a combination of two or more. When they are used in a combination of two or more, the mixing ratio thereof may be appropriately controlled according to the desired battery performance, which may be widely understood by those worked in the art.

In addition, when the carbonate-based solvent is used, it is favorable to use cyclic carbonate and chained carbonate in a mixture thereof. In this case, the cyclic carbonate and the chained carbonate are mixed at a volume ratio of 1:1 to 1:9, so that the performance of the electrolyte can be favorably exhibited.

The non-aqueous organic solvent according to an embodiment of the present invention may further contain an aromatic hydrocarbon-based organic solvent in addition to the carbonate-based solvent. Here, the carbonate-based solvent and the aromatic hydrocarbon based organic solvent may be mixed at a volume ratio of 1:1 to 30:1.

As the aromatic hydrocarbon-based organic solvent, an aromatic hydrocarbon-based compound of Chemical Formula 7 below may be used:

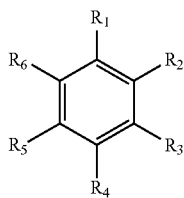

[Chemical Formula 7]

(wherein in Chemical Formula 7, $R_1$ to $R_6$ each are independently hydrogen, halogen, $C_1$-$C_{10}$ alkyl group, a holoalkyl group, or a combination thereof).

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, Iodo benzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further contain vinylene carbonate or an ethylene carbonate-based compound of Chemical Formula 8 below in order to improve the battery lifespan:

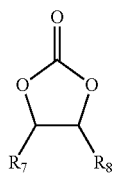

[Chemical Formula 8]

(wherein in Chemical Formula 8, $R_7$ and $R_8$ each are independently hydrogen, a halogen group, a cyano group (CN), a nitro group ($NO_2$), or a $C_1$-$C_5$ fluoroalkyl group, and at least one of $R_7$ and $R_8$ is a halogen group, a cyano group (CN), a nitro group ($NO_2$), or a $C_1$-$C_5$ fluoroalkyl group).

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When these lifespan improving additives are further used, the use amounts thereof may be appropriately controlled.

The lithium salt is dissolved in the organic solvent to act as a lithium ion supply source in the battery, thereby enabling a basic operation of a lithium secondary battery and promoting the movement of lithium ions between a positive electrode and a negative electrode. Representative examples of the lithium salt include, as a supporting electrolyte salt, at least one selected from the group consisting of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2, C_yF_{2y+1}SO_2$, here, x and y are a natural number), LiCl, LiI, and $LiB(C_2O_4)_2$ (lithium bis (oxalato) borate; LiBOB). The concentration of the lithium salt is preferably 0.1 to 2.0 M. If the concentration of the lithium salt falls within the above range, the electrolyte has appropriate electrical conductivity and viscosity, so that the electrolyte performance can be excellent and the lithium ions can be effectively moved.

A separator may be disposed between the positive electrode and the negative electrode depending on the kind of lithium secondary battery. As for the separator, polyethylene, polypropylene, polyvinylidene fluoride or multi-layers of two or more layers thereof may be used. Mixed multi-layers thereof such as a polyethylene/polypropylene double-layered separator, a polyethylene/polypropylene/polyethylene triple-layered separator, polypropylene/polyethylene/polypropylene triple-layered separator, and the like may be used.

Lithium secondary batteries may be classified into lithium ion batteries, lithium ion polymer batteries, and lithium polymer batteries according to the kinds of a separator and an electrolyte used therein. The lithium secondary batteries may be classified into cylindrical, prismatic, coin-type, and pouch-type batteries according to the shape. The secondary batteries may be classified into bulk type and thin film type batteries according to the size. Since structures and manufacturing methods of these batteries are widely known in the art, descriptions thereof will be omitted.

FIG. 1 is a schematic view showing a representative structure of a lithium secondary battery of the present invention. Referring to FIG. 1, a lithium secondary battery 1 includes a battery container 5 having a positive electrode 3, a negative electrode 2, and a separator 4 disposed between the positive electrode 3 and the negative electrode 2, which are impregnated with an electrolyte, and a sealing member 6 sealing the battery container 5.

Hereinafter, examples and comparative examples of the present invention will be described. However, the following examples are merely for illustrating the present invention, but the present invention is not limited thereto.

EXAMPLES

Synthetic Example 1

Preparation of Lithium Composite Oxide $Li_2CO_3$ (Product name: SQM) and $Ni_{0.47}Co_{0.20}Mn_{0.33}(OH)_2$ (D50: 5 μm) were mixed at a weight ratio of 1:1.03 (Metal:Li) using a mixer. The obtained mixture was fired for a total of 20 hours while the time rise reaction time was 6 hours in air and the time for a maintenance period was 7 hours at 950° C., thereby preparing a fired material.

The obtained fired material was slowly cooled and then reduced to powder, thereby obtaining a lithium composite oxide powder for mixing and firing according to an embodiment of the present invention.

Example 1

Preparation of Positive Electrode Active Material Through Mixing and Firing $Li_2CO_3$ (Product name: SQM) and $Ni_{0.55}Co_{0.20}Mn_{0.25}(OH)_2$ were mixed at a weight ratio of 1:1.03 (Metal:Li) using a mixer.

LiNi$_{0.47}$Co$_{0.20}$Mn$_{0.33}$O$_2$ was further added thereto such that the weight ratio of LiNi$_{0.55}$Co$_{0.20}$Mn$_{0.25}$O$_2$ and Li$_{0.47}$Co$_{0.20}$Mn$_{0.33}$O$_2$ of Synthetic Example 1 was 90:10.

The obtained mixture was fired for a total of 20 hours while the time rise reaction time was 6 hours in air and the time for a maintenance period was 7 hours at 940° C., thereby preparing a fired material.

The obtained fired material was slowly cooled and then reduced to powder, thereby preparing a positive electrode active material.

Example 2

Preparation of Positive Electrode Active Material Through Mixing and Firing

A positive electrode active material was prepared by the same method as in Example 1, except that LiNi$_{0.47}$Co$_{0.20}$Mn$_{0.33}$O$_2$ was added such that the weight ratio of LiNi$_{0.55}$Co$_{0.20}$Mn$_{0.25}$O$_2$ and LiNi$_{0.47}$Co$_{0.20}$Mn$_{0.33}$O$_2$ was 80:20, followed by mixing and firing.

Example 3

Preparation of Positive Electrode Active Material Through Mixing and Firing

A positive electrode active material was prepared by the same method as in Example 1, except that LiNi$_{0.47}$Co$_{0.20}$Mn$_{0.33}$O$_2$ was added such that the weight ratio of LiNi$_{0.55}$Co$_{0.20}$Mn$_{0.25}$O$_2$ and LiNi$_{0.47}$Co$_{0.20}$Mn$_{0.33}$O$_2$ was 70:30, followed by mixing and firing.

Example 4

Preparation of Positive Electrode Active Material Through Mixing and Firing

A positive electrode active material was prepared by the same method as in Example 1, except that Ti—Zr-codoped Li$_{0.47}$Co$_{0.20}$Mn$_{0.33}$O$_2$ prepared by further dry-mixing Ni$_{0.47}$Co$_{0.20}$Mn$_{0.33}$(OH)$_2$ with ZrO$_2$ powder and TiO$_2$ powder at a weight ratio of 100:0.27:0.33 and firing the mixture was used.

Comparative Example 1

Li$_2$CO$_3$ (Product name: SQM) and LiNi$_{0.55}$Co$_{0.20}$Mn$_{0.25}$O$_2$(OH)$_2$ were mixed at a weight ratio of 1:1.03 (Metal:Li) using a mixer.

The obtained mixture was fired for a total of 20 hours while the time rise reaction time was 6 hours in air and the time for a maintenance period was 7 hours at 940° C., thereby preparing a fired material. The obtained fired material was slowly cooled, and then reduced to powder, thereby preparing a positive electrode active material.

Comparative Example 2

LiNi$_{0.47}$Co$_{0.20}$Mn$_{0.33}$O$_2$ prepared in Synthetic Example 1 was used for a positive electrode active material.

Comparative Example 3

Li$_2$CO$_3$ (Product name: SQM) and Ni$_{0.55}$Co$_{0.20}$Mn$_{0.25}$(OH)$_2$ and Ni$_{0.47}$Co$_{0.20}$Mn$_{0.33}$(OH)$_2$ were mixed at a weight ratio of 1:1.03 (Metal:Li) using a mixer.

Here, the mixing was conducted such that the weight ratio of Ni$_{0.55}$Co$_{0.20}$Mn$_{0.25}$(OH)$_2$ and Ni$_{0.47}$Co$_{0.20}$Mn$_{0.33}$(OH)$_2$ was 90:10.

The obtained mixture was fired for a total of 20 hours while the time rise reaction time was 6 hours in air and the time for a maintenance period was 7 hours at 940° C., thereby preparing a fired material.

The obtained fired material was slowly cooled and then reduced to powder, thereby preparing a positive electrode active material.

Comparative Example 4

A positive electrode active material in which LiNi$_{0.55}$Co$_{0.20}$Mn$_{0.25}$O$_2$ prepared in Comparative Example 1 and LiNi$_{0.47}$Co$_{0.20}$Mn$_{0.33}$O$_2$ prepared in Synthetic example 1 were mixed at a weight ratio of 90:10 was used.

Experimental Example 1

Manufacture of Coin Cells

Each positive electrode slurry was prepared by adding 95 wt % of the positive electrode active material prepared in each of Examples 1 to 4 and Comparative Examples 1 to 4, 2.5 wt % of carbon black as a conductor, and 2.5 wt % of PVDF as a binder to 5.0 wt % of N-methyl-2-pyrrolidone (NMP) as a solvent.

The positive electrode slurry was coated on an aluminum (Al) thin film as a positive electrode current collector with a thickness of 20 to 40 μm and then vacuum-dried, followed by roll pressing, thereby preparing a positive electrode.

Li-metal was used for a negative electrode.

A coin cell type half cell was manufactured by using the thus prepared positive electrode, the Li-metal as a counter electrode, and 1.15 M LiPF6EC:DMC (1:1vol %) as an electrolyte. Then, the charge-discharge test was conducted at 3.0 V to 4.3 V.

Evaluation on Characteristics of Coin Cells

Table 1 below shows evaluation results of battery characteristics of coin cells manufactured in the experiment example.

TABLE 1

| | LiNi$_{0.55}$Co$_{0.20}$Mn$_{0.25}$O$_2$/ LiNi$_{0.47}$Co$_{0.20}$Mn$_{0.33}$O$_2$ | Remaining water-soluble lithium (wt %) | Formation discharge capacity (mAh/g) | Efficiency (%) | Rate (1.0 C/ 0.1 C, %) | Lifespan characteristics (30CY/1CY, %) |
|---|---|---|---|---|---|---|
| Example 1 | 90/10 | 0.245 | 174.11 | 89.32 | 92.41 | 89.27 |
| Example 2 | 80/20 | 0.230 | 173.88 | 89.27 | 91.86 | 89.12 |
| Example 3 | 70/30 | 0.212 | 173.18 | 88.99 | 91.58 | 89.40 |
| Example 4 | 90/10 | 0.251 | 174.03 | 89.62 | 92.73 | 90.88 |
| Comparative Example 1 | 100/0 | 0.352 | 173.20 | 88.61 | 89.92 | 89.30 |

TABLE 1-continued

| | $LiNi_{0.55}Co_{0.20}Mn_{0.25}O_2/$ $LiNi_{0.47}Co_{0.20}Mn_{0.33}O_2$ | Remaining water-soluble lithium (wt %) | Formation discharge capacity (mAh/g) | Efficiency (%) | Rate (1.0 C/ 0.1 C, %) | Lifespan characteristics (30CY/1CY, %) |
|---|---|---|---|---|---|---|
| Comparative Example 2 | 0/100 | 0.182 | 168.30 | 89.58 | 90.61 | 91.20 |
| Comparative Example 3 | 90/10 | 0.302 | 172.48 | 88.57 | 89.76 | 89.11 |
| Comparative Example 4 | 90/10 | 0.325 | 172.52 | 88.70 | 89.86 | 89.26 |

Examples 1 to 3 showed equivalent or higher Formation discharge capacity as compared with Comparative Example 1 using a single composition.

This feature cannot be expressed in the case of the mixture of lithium composite oxides (Comparative Example 4), which corresponds to the conventional art. This is construed as a result of a selective Li reaction induced by adding a Li compound to a mixture of a precursor and a lithium composite oxide and performing firing in an embodiment of the present invention.

Further, it can be confirmed that, in consideration of remaining water-soluble lithium values in Examples 1 to 3, the examples of the present invention have a remarkable effect in reducing the remaining water-soluble lithium even though the remaining water-soluble lithium values were calculated to reflect the mixing ratios by using the remaining water-soluble lithium values in Comparative Examples 1 and 2.

Examples 1 to 3 showed excellent efficiency and rate characteristics and equivalent or higher lifespan characteristics, as compared with Comparative Example 1.

In addition, when compared with Example 1, Example 4 in which a positive electrode material substituted with a transition metal was used can be confirmed to have improved lifespan and rate characteristics, which result from transition metal substitution.

Comparative Example 3, in which precursors having different compositions were mixed and then fired at a particular temperature, which corresponds one of the conventional arts, showed reduced efficiency, rate characteristics and/or lifespan characteristics as compared with Examples 1 to 4.

In order to obtain the optimum performance in the composition $Ni_\alpha Co_\beta Mn_\gamma$, the firing temperature needs to be varied depending on the ratio of Ni/Co/Mn. However, when precursors having different compositions are mixed and fired, the firing temperature needs to be selected to be optimum to a particular composition or the firing temperature needs to be set by a temperature between or among individual optimum firing temperatures for different compositions, and thus the optimum battery performance cannot be exhibited.

In addition, Comparative Example 4 in which lithium composite oxides having different compositions are mixed could not show an effect in reducing the remaining water-soluble lithium, which corresponds to an effect of Examples 1 to 4, and showed reduced effects in Formation discharge capacity, efficiency, rate characteristics, and the like, as compared with Examples 1 to 4.

Experimental Example 2

EDS Analysis on Precursor and Positive Electrode Active Material

Ten precursor particles having a composition of $Ni_{0.55}Co_{0.20}Mn_{0.25}$ and ten particles of Comparative Example 1 are randomly selected and then EDS analysis (energy dispersive spectrometer, x-act, OXFORD Inc.) was performed thereon. Table 2 shows the mean and standard deviation of EDS value for each case.

Ten particles having relatively a higher Ni content were randomly selected from the positive electrode active material obtained in Example 1. The surface analysis results thereof were expressed as Examples 1-1 to 1-10. Ten particles having relatively a higher Ni content were randomly selected from the positive electrode active material obtained in Comparative Example 3. The surface analysis results thereof were expressed as Comparative Examples 3-1 to 3-10.

TABLE 2

| | EDS Ni (mole %) | |
|---|---|---|
| Sample | Mean | Standard deviation |
| $Ni_{0.55}Co_{0.20}Mn_{0.25}$ precursor | 55.41 | ±0.65 |
| Comparative Example 1 | 55.37 | ±0.46 |
| Example 1 | 54.29 | ±0.55 |
| Example 1-1 | 54.31 | |
| Example 1-2 | 53.89 | |
| Example 1-3 | 54.59 | |
| Example 1-4 | 53.69 | |
| Example 1-5 | 54.12 | |
| Example 1-6 | 54.99 | |
| Example 1-7 | 55.12 | |
| Example 1-8 | 54.76 | |
| Example 1-9 | 53.74 | |
| Example 1-10 | 53.67 | |
| Comparative Example 3 | 52.23 | ±1.17 |
| Comparative Example 3-1 | 52.04 | |
| Comparative Example 3-2 | 53.38 | |
| Comparative Example 3-3 | 52.92 | |
| Comparative Example 3-4 | 50.49 | |
| Comparative Example 3-5 | 52.39 | |
| Comparative Example 3-6 | 52.12 | |
| Comparative Example 3-7 | 51.19 | |
| Comparative Example 3-8 | 52.27 | |
| Comparative Example 3-9 | 51.06 | |
| Comparative Example 3-10 | 54.47 | |

Example 1, as an embodiment of the present invention, in which the positive electrode active material was prepared by mixing and firing the precursor and the lithium composite oxide, has two different composition groups of $Ni_\alpha Co_\beta Mn_\gamma$, and Table 2 obtained from EDS analysis results showed that, of the particles having the two compositions, the surface Ni content of particles having a higher Ni content was further reduced as compared with Comparative Example 1 in which the mixing and firing were not performed. In addition, Comparative Example 3, as one of the conventional arts, in which precursors having different compositions were mixed and fired, has two different composition groups of $Ni_\alpha Co_\beta Mn_\gamma$, and, it can be seen that, of the particles having the two compositions, the surface Ni content of particles having a higher Ni content was largely reduced.

Experimental Example 3

Analysis of Remaining Water-Soluble Lithium

In Examples 1 to 4 and Comparative Examples 1 to 4, the remaining water-soluble lithium was analyzed by using titration.

The present invention is not limited to the embodiments but may be implemented into different forms, and those skilled in the art will understand that the present invention may be implemented in alternative embodiments without changing technical spirits and necessary characteristics of the present invention. Thus, the embodiments described above should be construed as being exemplified and not limiting the present disclosure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for preparing a positive electrode active material for a lithium secondary battery, the method comprising:
preparing a mixture of a precursor represented by Chemical Formula 1 below, a lithium composite oxide represented by Chemical Formula 2 below and capable of intercalating/deintercalating lithium ions, and a lithium feed material; and
firing the prepared mixture:

$$A(OH)_{2-a} \quad \text{[Chemical Formula 1]}$$

wherein in Chemical Formula 1, $A=Ni_\alpha Co_\beta Mn_\gamma$; and $-0.3 \le a \le 0.3$, $0.5 \le \alpha \le 0.64$, $0.15 \le \beta \le 0.29$, and $0.21 \le \gamma \le 0.35$, $$Li[Li_z A_{(1-z-a)} D_a] E_b O_{2-b} \quad \text{[Chemical Formula 2]}$$

wherein in Chemical Formula 2, $A=Ni_\alpha Co_\beta Mn_\gamma$; D is at least one element selected from the group consisting of Mg, Al, B, Zr, and Ti; E is at least one element selected from the group consisting of P, F, and S; and $-0.05 \le z \le 0.1$, $0 \le a \le 0.05$, $0 \le b \le 0.05$, $0.35 \le \alpha < 0.5$, $0.19 \le \beta \le 0.34$, and $0.31 \le \gamma \le 0.46$.

2. The method of claim 1, wherein the weight ratio of the precursor represented by Chemical Formula 1 to the lithium composite oxide represented by Chemical Formula 2 and capable of intercalating/deintercalating lithium ions is 95/5 to 70/30.

3. The method of claim 1, wherein the precursor represented by Chemical Formula 1 has a particle diameter of 8 to 12 μm.

4. The method of claim 1, wherein the lithium composite oxide represented by Chemical Formula 2 and capable of intercalating/deintercalating lithium ions has a particle diameter of 3 to 8 μm.

5. The method of claim 1, wherein the lithium feed material is nitrate, carbonate, acetate, oxalate, oxide, hydroxide, or sulfate, which contains lithium, or a combination thereof.

6. The method of claim 1, wherein the precursor represented by Chemical Formula 1 is represented by Chemical Formula 3 below:

$$A(OH)_{2-a} \quad \text{[Chemical Formula 3]}$$

wherein in Chemical Formula 3, $A=Ni_\alpha Co_\beta Mn_\gamma$; and $-0.3 \le a \le 0.3$, $0.5 \le \alpha \le 0.61$, $0.15 \le \beta \le 30.26$, and $0.24 \le \gamma \le 0.35$.

7. The method of claim 1, wherein the lithium composite oxide represented by Chemical Formula 2 and capable of intercalating/deintercalating lithium ions is represented by Chemical Formula 4 below:

$$Li[Li_z A_{(1-z-a)} D_a] E_b O_{2-b} \quad \text{[Chemical Formula 4]}$$

wherein in Chemical Formula 4, $A=Ni_\alpha Co_\beta Mn_\gamma$; D is at least one element selected from the group consisting of Mg, Al, B, Zr, and Ti; E is at least one element selected from the group consisting of P, F, and S; and $-0.05 \le z \le 0.1$, $0 \le a \le 0.05$, $0 \le b \le 0.05$, $0.43 \le \alpha < 0.5$, $0.19 \le \beta \le 0.26$, and $0.31 \le \gamma \le 0.38$.

8. The method of claim 1, wherein in the firing of the prepared mixture, the firing temperature is 800 to 1000° C.

9. The method of claim 1, wherein the particle diameter of the precursor represented by Chemical Formula 1 is larger than the particle diameter of the lithium composite oxide represented by Chemical Formula 2 and capable of intercalating/deintercalating lithium ions.

10. The method of claim 1, wherein the amount of remaining water-soluble lithium after the firing of the prepared mixture is reduced to 20 to 50% based on the amount of remaining water-soluble lithium when the precursor represented by Chemical Formula 1 is fired alone.

11. The method of claim 1, wherein in the positive electrode active material for a lithium secondary battery, which is obtained by performing the firing of the prepared mixture, the surface Ni content of a positive electrode active material derived from Chemical Formula 1 is further reduced than the surface Ni content of a positive electrode active material prepared by firing the precursor represented by Chemical Formula 1 alone.

12. The method of claim 11, wherein the surface Ni content of the positive electrode active material derived from Chemical Formula 1 is further reduced by less than 5% than the surface Ni content of the positive electrode active material prepared by firing the precursor represented by Chemical Formula 1 alone.

13. The method of claim 11, wherein, when ten particles of the positive electrode active material derived from Chemical Formula 1 are randomly selected from the positive electrode active material for a lithium secondary battery and surfaces thereof are analyzed, the standard deviation of the Ni content is smaller than 1.00.

* * * * *